US008009820B2

(12) United States Patent
Curtis

(10) Patent No.: US 8,009,820 B2
(45) Date of Patent: Aug. 30, 2011

(54) INTELLIGENT SERVICE MANAGEMENT SYSTEM

(75) Inventor: David C. Curtis, Crofton, MD (US)

(73) Assignee: Wisor Telecom Corporation, Bridgewater, NJ (US)

( * ) Notice: Subject to any disclaimer, the term of this patent is extended or adjusted under 35 U.S.C. 154(b) by 2627 days.

(21) Appl. No.: 10/255,338

(22) Filed: Sep. 26, 2002

(65) Prior Publication Data
US 2003/0061068 A1 Mar. 27, 2003

Related U.S. Application Data

(60) Provisional application No. 60/324,887, filed on Sep. 26, 2001.

(51) Int. Cl.
*H04M 7/00* (2006.01)
*G06Q 10/00* (2006.01)
(52) U.S. Cl. .............. 379/221.02; 379/201.03; 705/8; 705/9
(58) Field of Classification Search .............. 705/1, 37, 705/34, 26, 27, 400, 412, 1.1, 7, 8, 9, 10, 705/11, 26.5, 26.7, 26.8, 26.81, 26.82, 28, 705/29, 30; 700/100, 101, 102; 379/201.12, 379/201.03, 207.02, 219, 220.01, 221.02, 379/114.01, 115.02, 115.01
See application file for complete search history.

(56) References Cited

U.S. PATENT DOCUMENTS

| | | | |
|---|---|---|---|
| 5,687,224 A | 11/1997 | Alley, Jr. et al. | |
| 5,862,203 A | 1/1999 | Wulkan et al. | |
| 5,883,946 A | 3/1999 | Beck et al. | |
| 5,943,412 A * | 8/1999 | Courvoisier | 379/211.02 |
| 6,078,652 A * | 6/2000 | Barak | 379/114.02 |
| 6,085,171 A | 7/2000 | Leonard | |
| 6,104,798 A | 8/2000 | Lickiss et al. | |
| 6,219,692 B1 * | 4/2001 | Stiles | 709/201 |
| 6,324,273 B1 | 11/2001 | Alcott | |
| 6,349,238 B1 | 2/2002 | Gabbita et al. | |
| 6,366,657 B1 * | 4/2002 | Yagel et al. | 379/201.03 |
| 6,411,697 B1 | 6/2002 | Creamer et al. | |
| 6,853,621 B1 * | 2/2005 | Spear et al. | 370/238 |
| 6,912,545 B1 * | 6/2005 | Lundy et al. | 707/104.1 |
| 6,914,969 B2 * | 7/2005 | Creamer et al. | 379/201.03 |
| 7,003,473 B2 * | 2/2006 | Curtis et al. | 705/7 |
| 2001/0034627 A1 * | 10/2001 | Curtis et al. | 705/7 |
| 2002/0169867 A1 * | 11/2002 | Mann et al. | 709/224 |

OTHER PUBLICATIONS

Chen et al. "SP-to-SP Service Ordering Specification and its Implementation" 1998; Proceedings of the 1998 IEEE Network Operations and Management Symposium. Part 1 (of 3); New Orleans, LA, USA.*

* cited by examiner

*Primary Examiner* — Igor Borissov
(74) *Attorney, Agent, or Firm* — The Marbury Law Group, PLLC

(57) ABSTRACT

A system manages the operations of an integrated communications provider. One aspect of the system is a work flow engine. The work flow engine decomposes the service model into sub-model components based upon whether crossing of plural networks is appropriate to provide requested telecommunication services and which service providers are available to provide service consistent with the location of the customer. The work flow engine also creates a telecommunications design from the sub-model components based on order rules of the service providers. The system automatically retrieves customer service records and preparing sales proposals based on those records. The system includes a gateway to incumbent local exchange carriers and trading partner service providers. The system incorporates features that automate comparisons between existing services and proposed services, optimizing on-net and off-net services, creation of cutover reports, issuance of service requests to local exchange carriers and trading partners, and alarming of failures of confirmations.

21 Claims, 11 Drawing Sheets

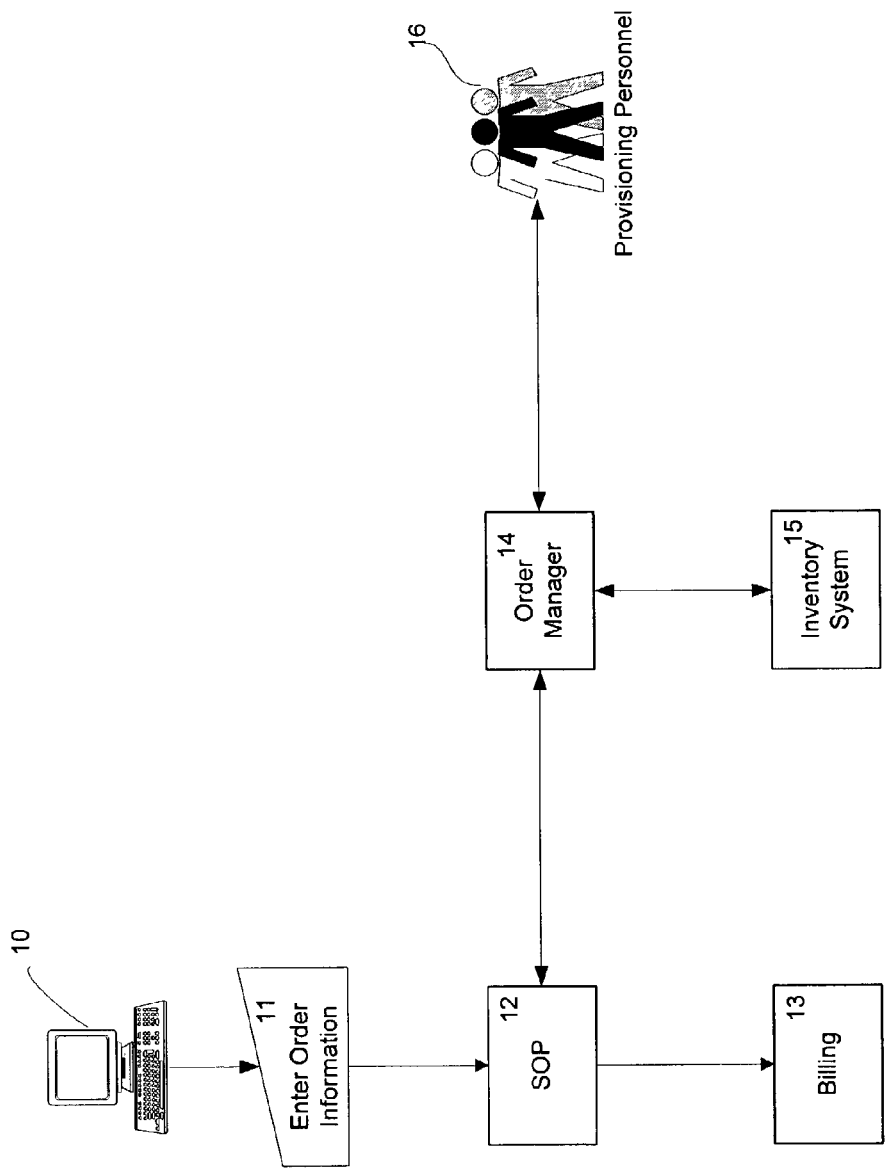
Figure 1 - Pre-1984 LEC Service Management System

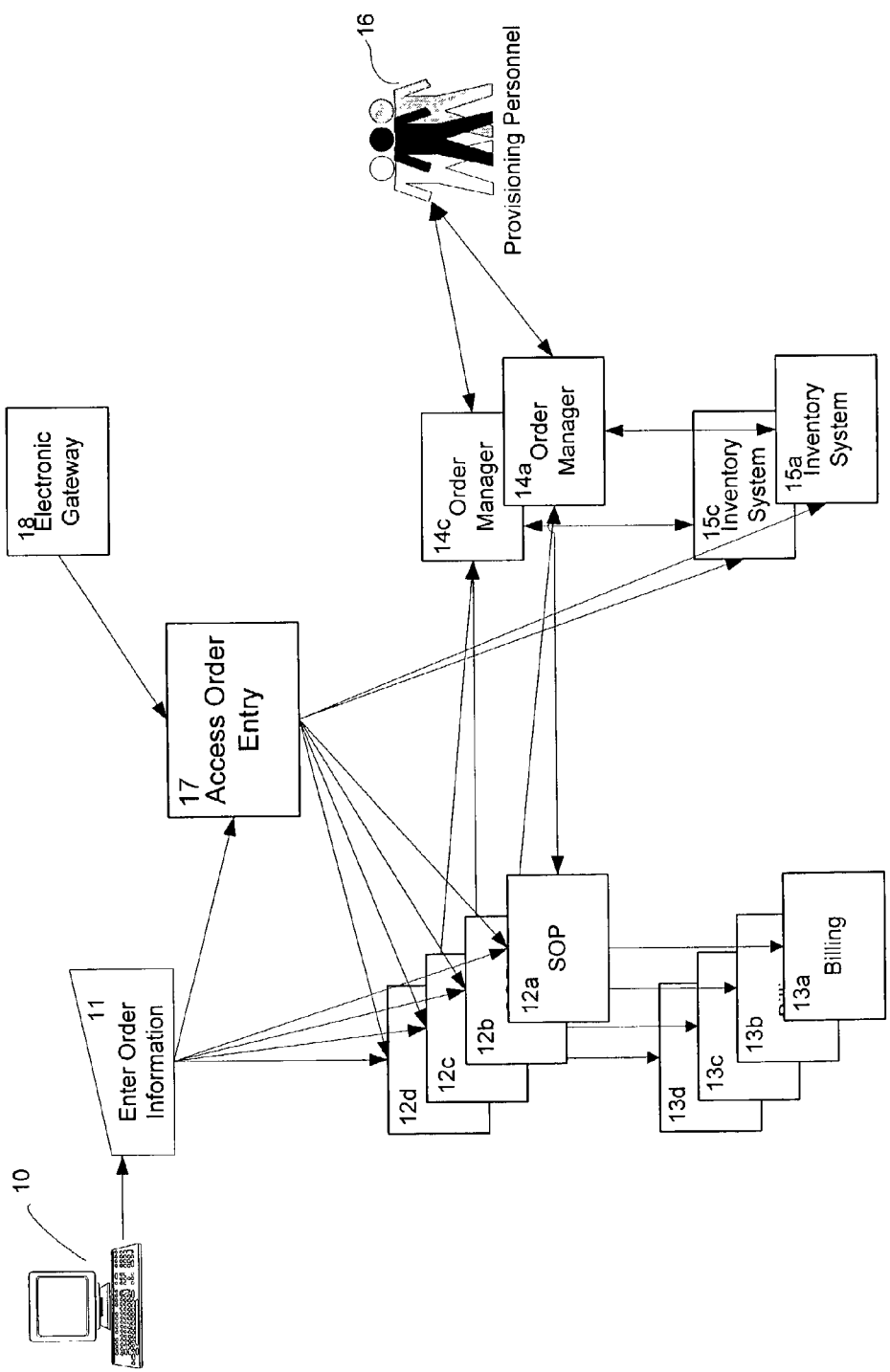
Figure 2 - 1984-1996 LEC Service Management System

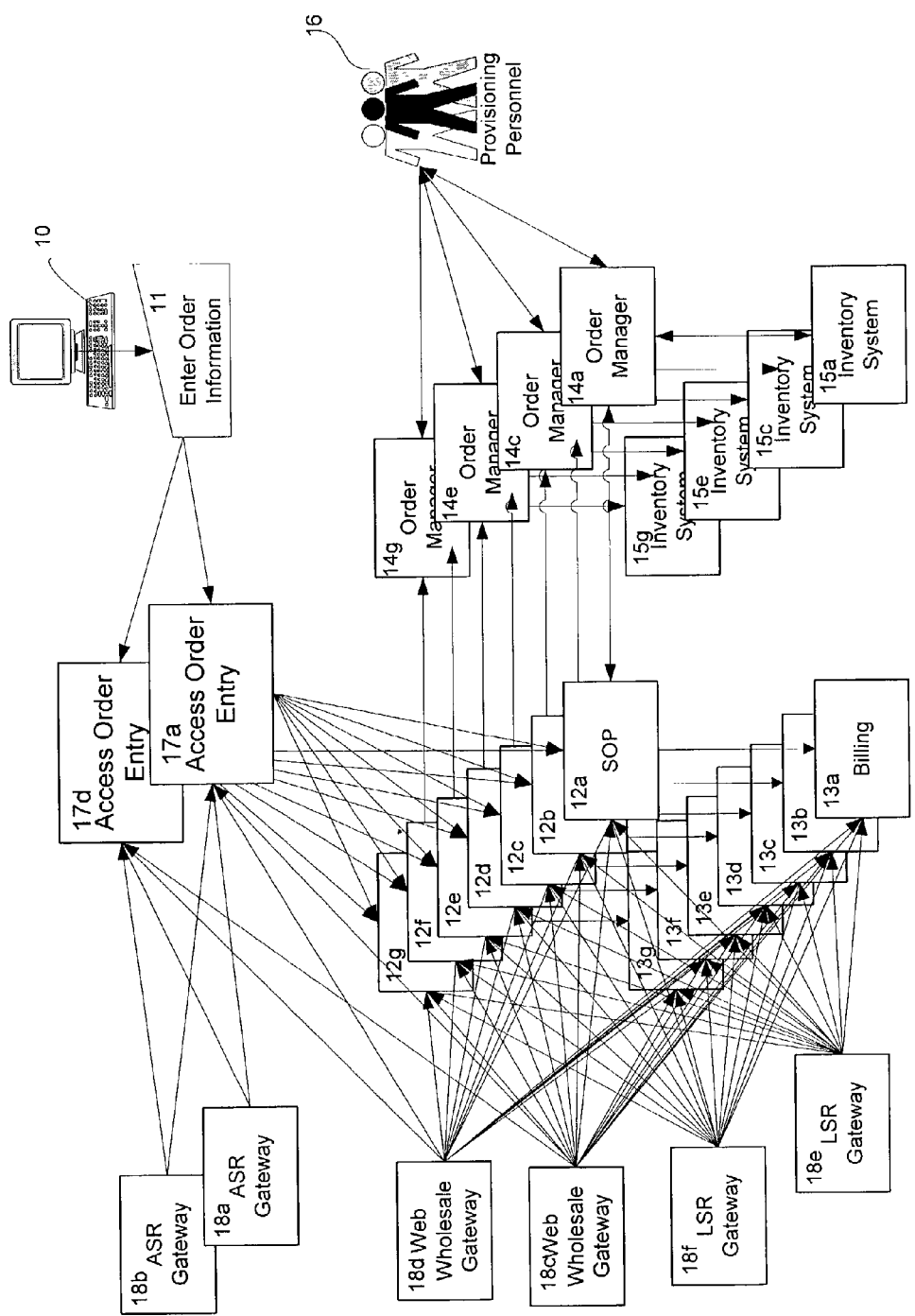
Figure 3 - LEC Service Management System

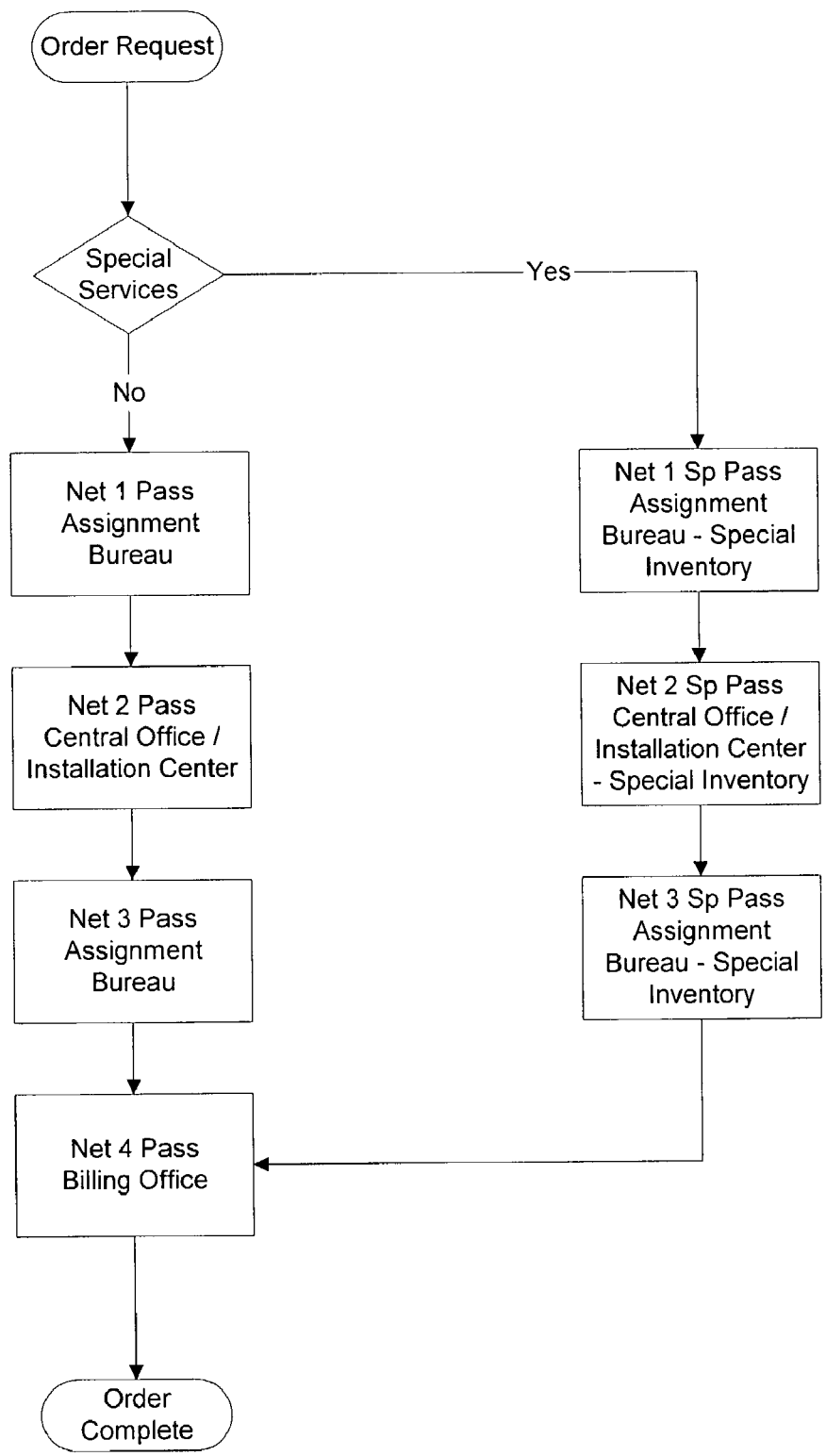
Figure 4 - Pre-1984 Service Order Fulfillment Proces

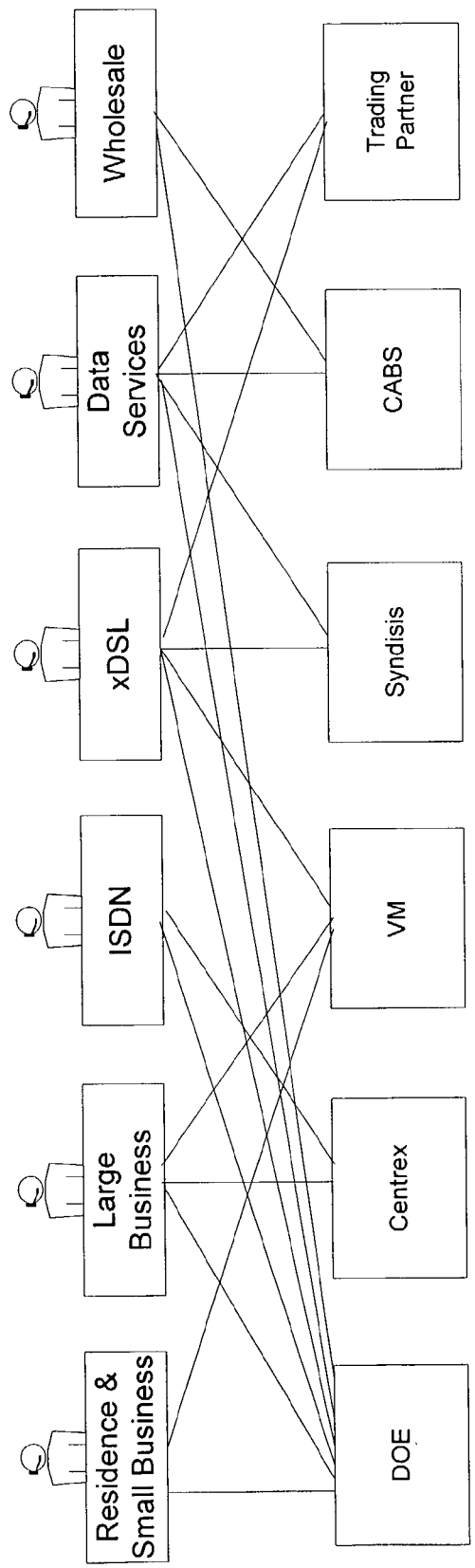
Figure 5 - Present Order Entry Process

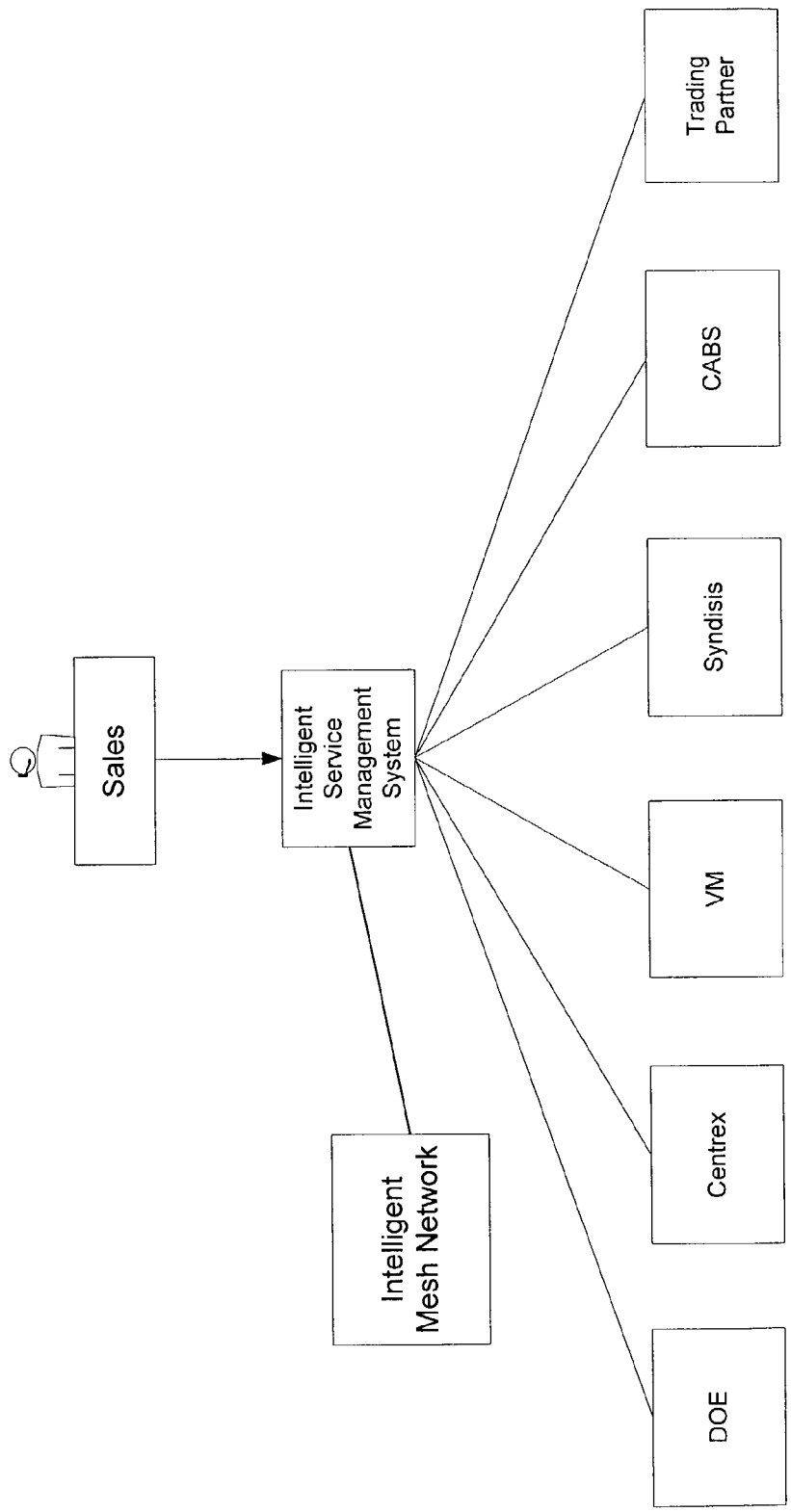
Figure 6 – Intelligent Order Entry Process

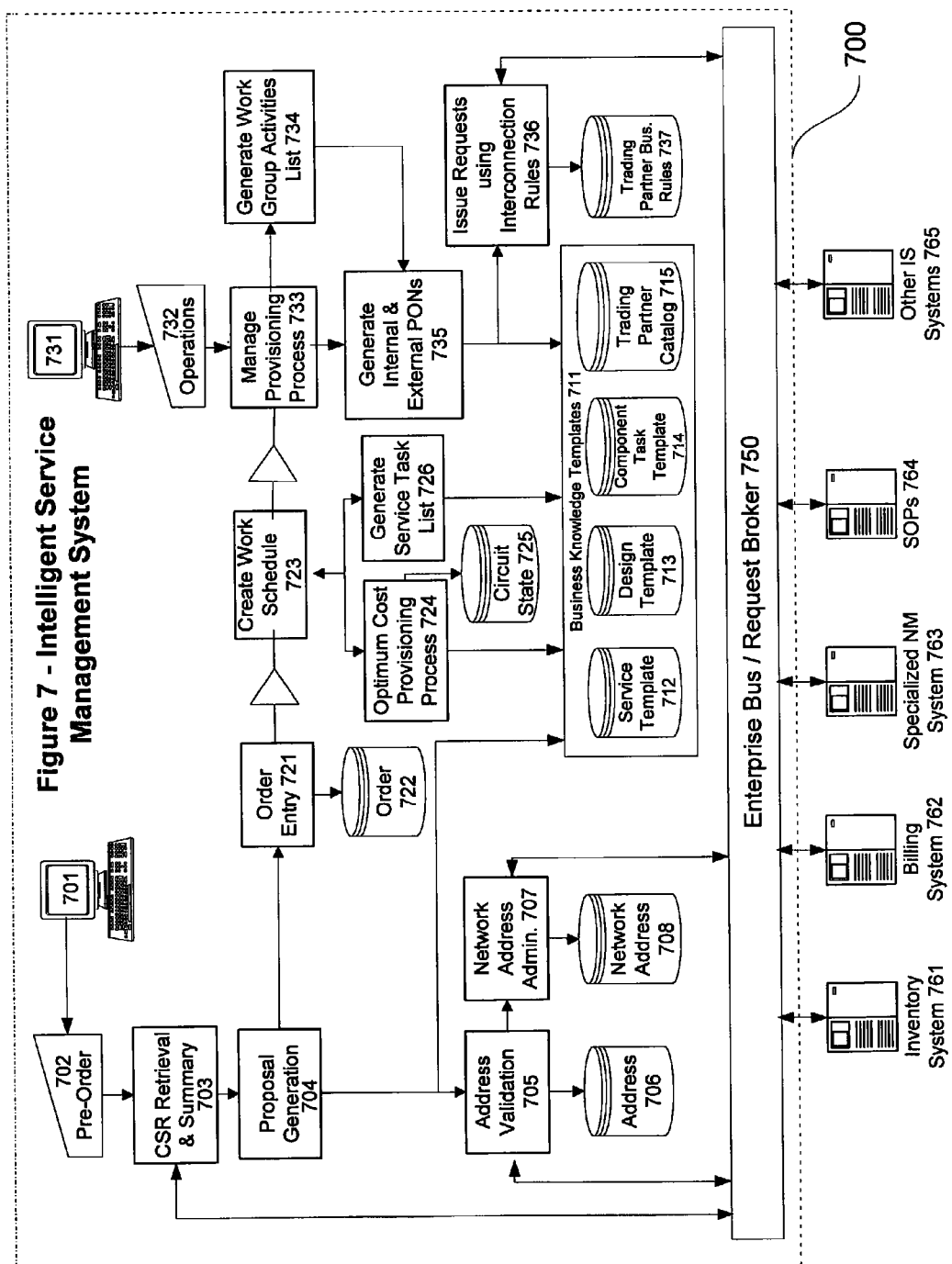

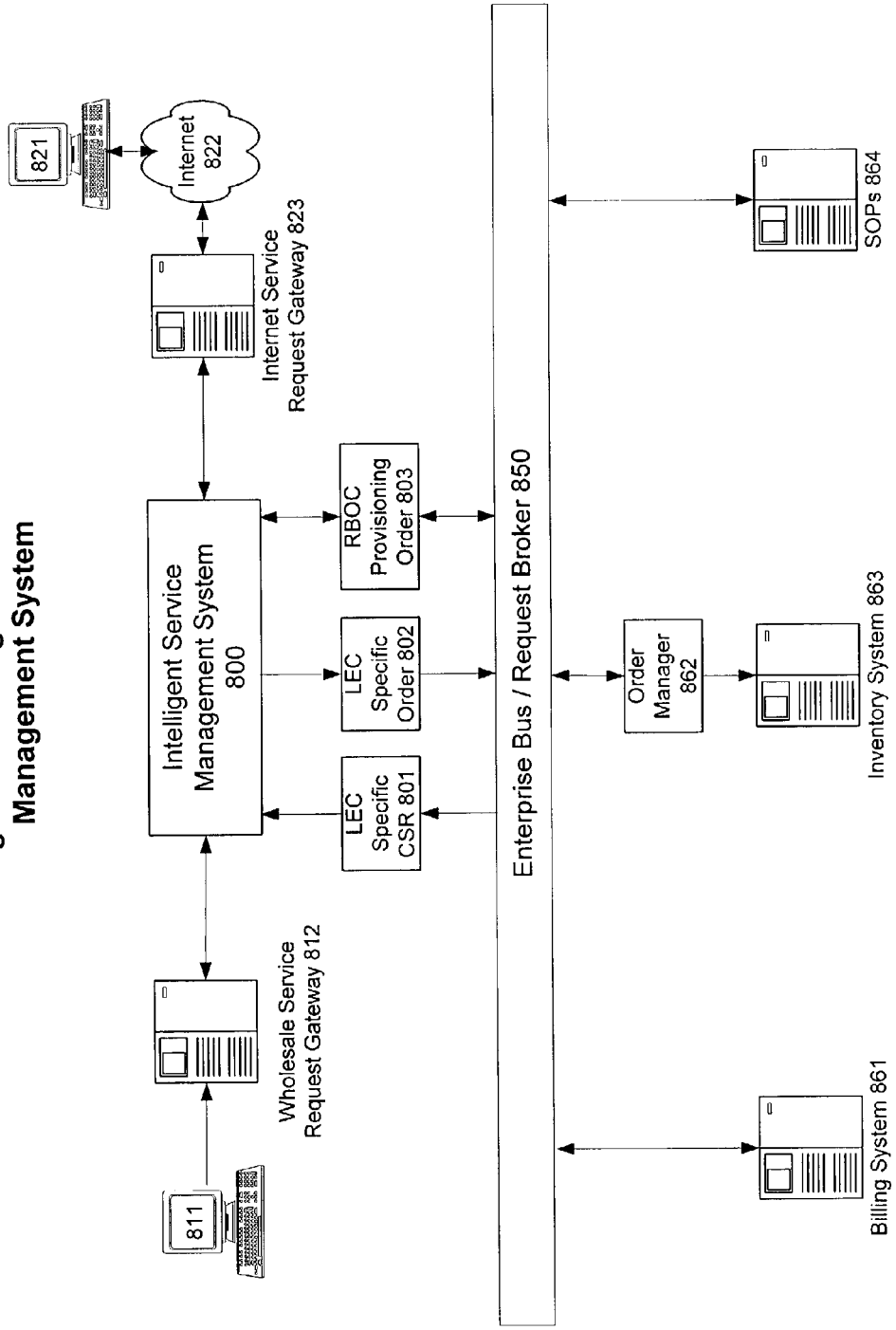

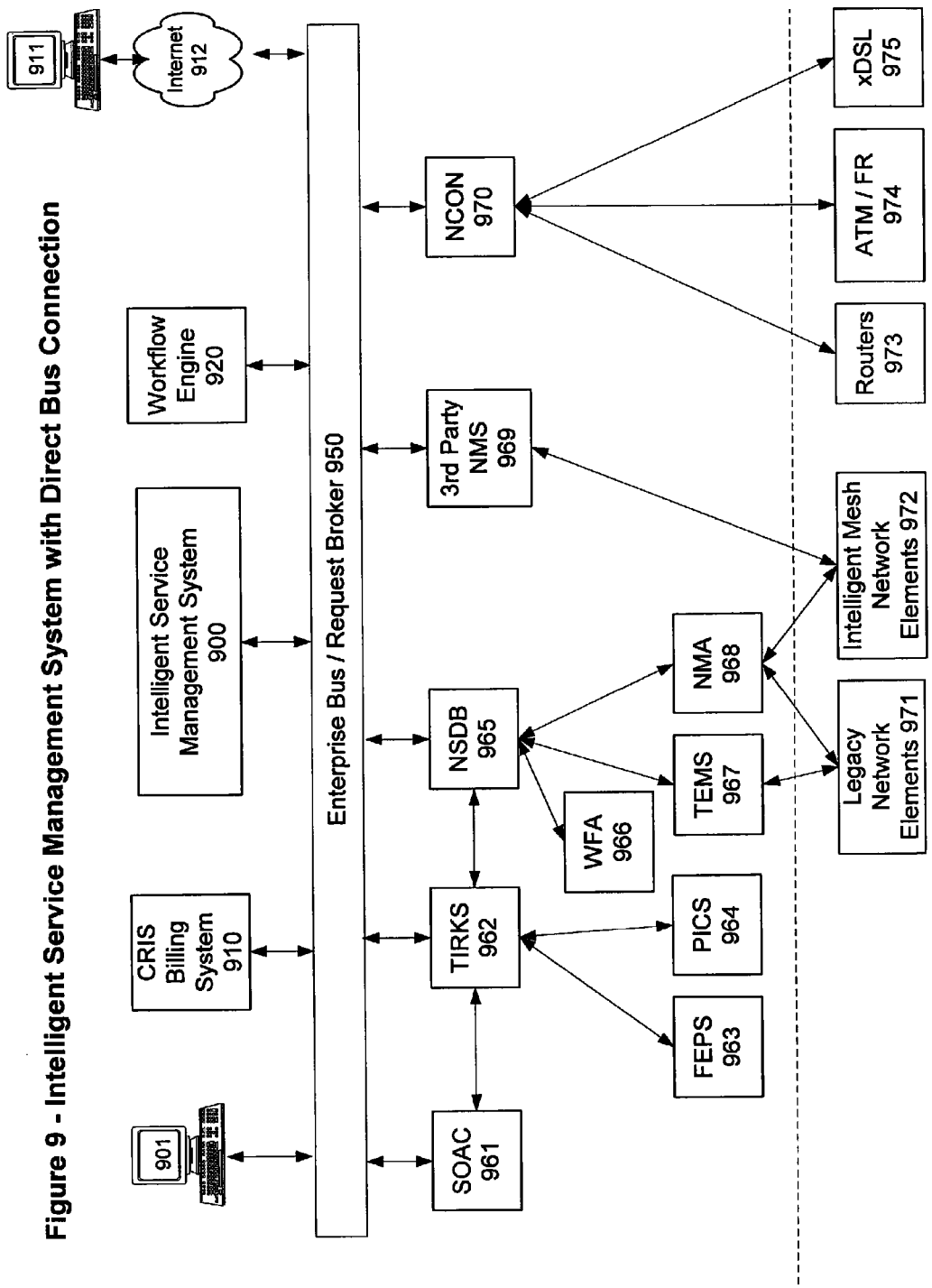
Figure 9 - Intelligent Service Management System with Direct Bus Connection

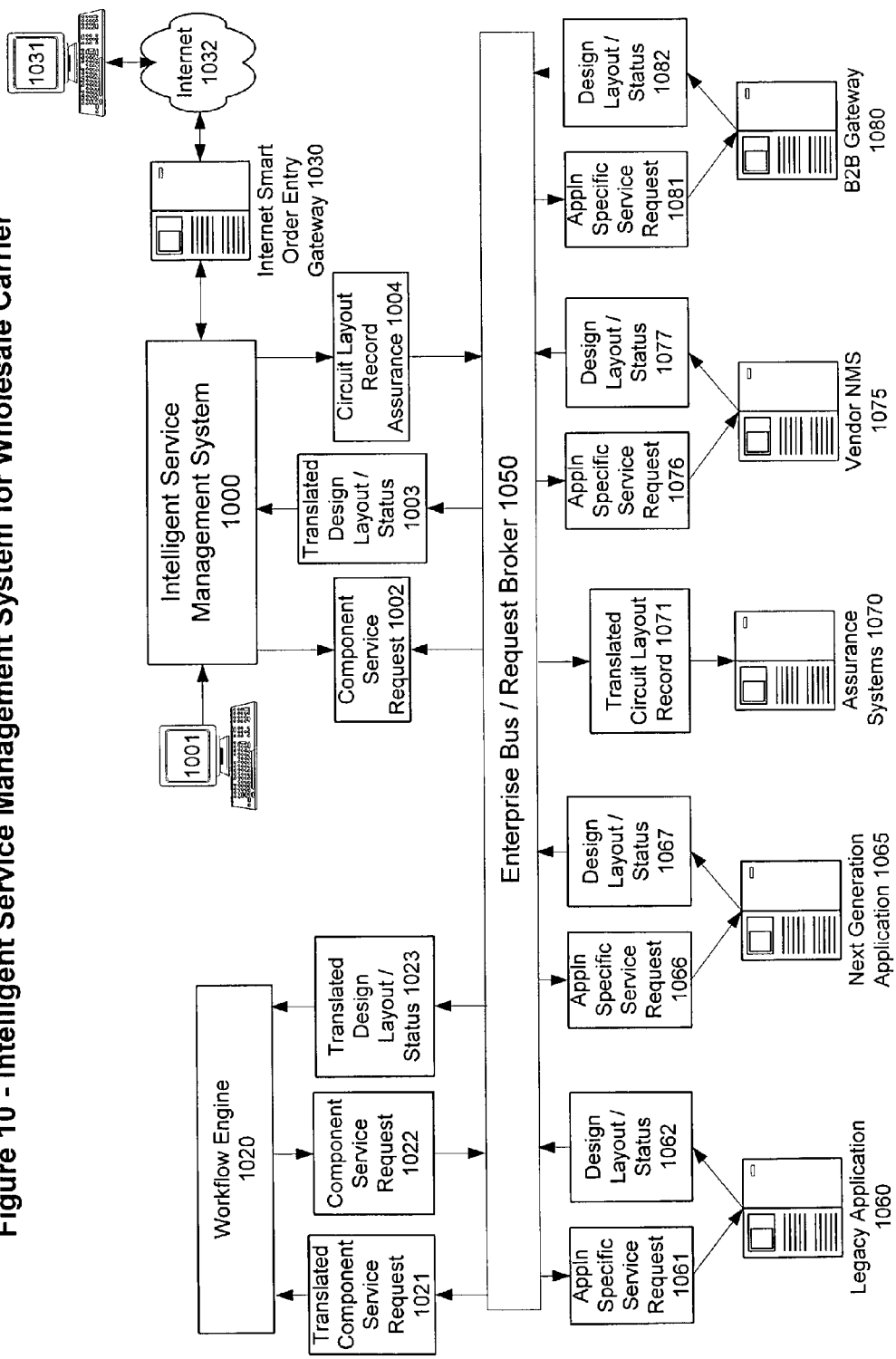
Figure 10 - Intelligent Service Management System for Wholesale Carrier

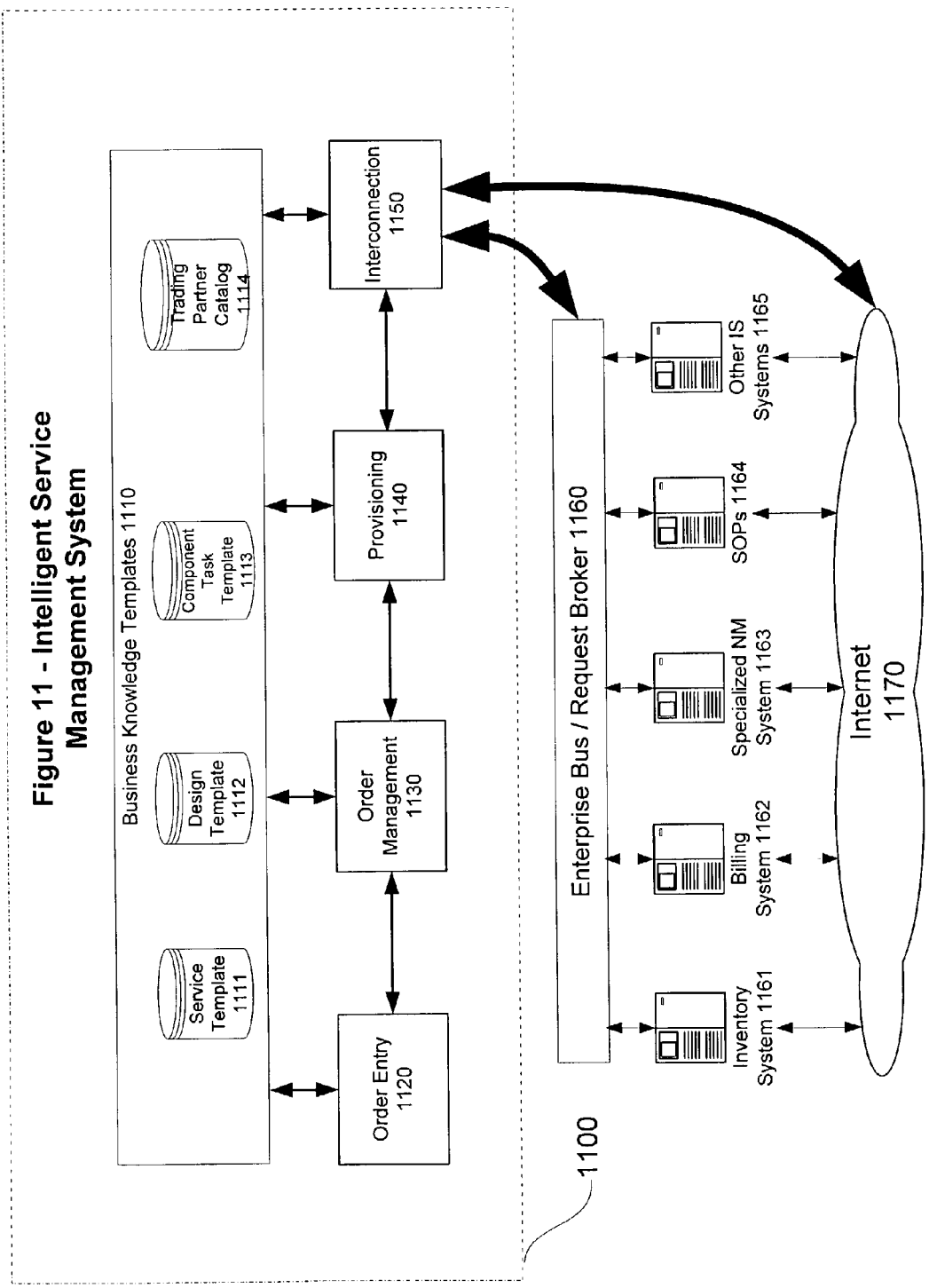

INTELLIGENT SERVICE MANAGEMENT SYSTEM

CROSS REFERENCE TO OTHER PATENT APPLICATIONS

This application claims the benefit of U.S. Provisional Application No. 60/324,887, filed Sep. 26, 2001, entitled "System and Method for Intelligent Enterprise Application Integration" and naming David C. Curtis as inventor.

FIELD OF THE INVENTION

The present invention relates to a system and method for processing orders for telecommunication services received by a telecommunication services provider.

BACKGROUND OF THE INVENTION

Telecommunications service providers are entering the age wherein new service offerings and technological changes occur on a frequent basis. In order to maintain a competitive edge, providers need the ability to easily manage and integrate telecommunication solutions that cover a customer's need for voice, data, video and Internet networks in a cost effective manner. Large customers and enterprises further complicate such solutions when they span not only large distances but also multiple telecommunication vendors. Presently the creation of such integrated solutions is a semi-manual system that is costly, often inaccurate and slow in implementation.

With the passage of the Telecommunications Act ("the Act") of 1996, the United States telecommunications industry is in a state of radical change. Among other things, the Act requires that Incumbent Local Exchange Carriers (ILEC), the regulated entity that owns and administers an existing access network, provide to any requesting telecommunications carrier (hereinafter referred to as "Competitive Local Exchange Carriers" (CLEC), Integrated Communications Provider (ICP), or Competitive Service Provider (CSP)) nondiscriminatory access to network elements on an unbundled basis and to allow CLECs, ISPs or CSPs to combine such network elements in order to provide telecommunications service. ILECs also have a duty to provide to CLECs interconnection with their network for the transmission and routing of telephone exchange service and exchange access. The interconnection contemplated by the Act provides nondiscriminatory access or interconnection to such services or information as are necessary to allow the requesting CLEC to implement local dialing parity, including nondiscriminatory access to telephone numbers, operator service, directory assistance, and directory listing, with no unreasonable dialing delays.

The provisions of the Act have demonstrated a need for competing exchange carriers to be interconnected so that customers can seamlessly receive calls that originate on another carrier's network and place calls that terminate on another's carrier's network without performing additional activities, such as dialing extra digits, etc. A CLEC can offer multiple types of services, including basic POTS, IXC long distance carrier service, ISP Internet Service Provider, VPN (virtual private network), VoIP (voice over internet), VoDSL (voice over DSL access), video, etc. Many of the more advanced services require access to broadband services.

Digital Subscriber Line (xDSL) technology allows customer access to broadband services over their existing copper wire connection to the ILEC. With DSL, subscribers only need to purchase (or lease) a comparatively inexpensive DSL modem and connect it to the existing copper wire connection. Other advances in broadband data services can be combined with DSL service to provide the subscriber with additional connectivity options. Virtual Private Networks (VPNs) are also seeing explosive growth, especially in the remote-office and tele-commuter environments. VPNs and DSL allow a subscriber to connect to a private corporate network over a public infrastructure securely, while maintaining high bit-rate transmissions. Subscribers are also beginning to test the waters with Voice Over DSL (VoDSL) deployments. This technology allows subscribers to run multiple phone and data connections over a single copper line, using just one customer premise xDSL modem.

The opportunities for CLECs, IXCs, and ISPs (collectively identified from this point on as Integrated Communications Providers or ICPs) offering these services are immense. Data transport demands have opened up a whole new set of revenue generating opportunities for ICPs. However, the growth rate and myriad of convergent offerings make it difficult for companies to establish themselves in any one market. To be successful, ICPs need to remain flexible, customer focused, and establish a continual set of value propositions and competitive advantages within the marketplace.

ILECs have developed different methods to allow ICPs to electronically place orders with the ILEC for wholesale products and services. For example, U.S. Pat. No. 6,104,999 to Gilles et al. and incorporated by reference herein, discloses that LECs use Internet browser forms, proprietary protocols and electronic data interchange (EDI).

In one embodiment, the Gilles patent discloses methods of using EDI for telecommunication provider retrieval of customer service records and electronic services ordering. An authorized ICP or reseller utilizes EDI to request from the ILEC the present services being provided to a particular customer. The ILEC uses EDI to transfer the customer service record to the ICP. In a separate embodiment, the ICP uses EDI to electronically order revisions or additions to service.

Much of the difficulty for automating electronically placed orders can be traced to the history of the telecommunications industry in this country. Prior to 1984 local exchange carriers (LECs) created billing and service order processing systems on a company-by-company, leading to variations from one to another. An example of an LEC billing and service order processing system is illustrated in FIG. 1. A service order that requests the installation, change, or disconnection of a service from a customer's account was required to feed these systems. The service order identified the service required, where it was to be located, what action was to needed, and when.

As is illustrated in FIG. 1, a typical LEC service management system prior to 1984 was relatively simple. An operator, using a terminal 10 or other input device enters order information 11. The order information enters service order processor (SOP) 12. SOP 12 causes the order request to be entered into order manager 14 and establish billing information that is directed to billing system 13. Order manager 14 communicates with the telecommunication services inventory system 15 to establish availability and reserve hardware and numbers to the order. Once inventory system 15 places required hardware and numbers on reserve, order manager 14 schedules provisioning personnel 16 to make any needed wiring or other physical connections and hardware initializations.

To identify specific services, the service management system of FIG. 1 uses service codes called Universal Service Order Codes (USOC). The USOCs defined each line's features and before 1984 were established and maintained by Telcordia Technologies Inc in a "catalog". Although universal across companies, not all USOCs were available in each LEC.

The USOCs supported in a given state directly aligned with tariffs filed with the state's regulatory body. Each billing system had rates associated with each USOC, the sum of which equated to an overall line charge. Since each LEC operated as an individual company, each had a local USOC catalog as a subset of the universal catalog.

Each LEC had its own customer support units that was proficient in the use of the local SOP, USOCs and embedded business rules. Likewise, operations were self-contained within the LEC and therefore the LEC had full understanding of the service order.

In 1984, groups of LECs were pieced together to become the 7 Regional Bell Operating Companies (RBOC). With the RBOCs came new access tariffs. To support these access tariffs, new ordering codes were created, known as network channels (NC) and Network Channel Interface Codes (NCI). Network channels describe the type of line that is being requested of the LEC from the customer under the access tariff. Network Channel Interface Codes describe the features or options that are found at the interconnection points between the LEC and the customer or end-user.

For billing purposes, these codes were translated into USOCs, allowing their placement into the SOPs and billing systems. Both manual and electronic interconnection between the customer and the LEC occurred using the NC and NCI codes that were covered under the Federal tariffs. This allowed the customer to communicate with any LEC using a common code and rule set.

Although each RBOC could independently vary its ordering rules, all LECs belonging to the RBOC presented a common look and feel to the outside world. Deviations among the LECs were kept internal. This required translators and processes to take the necessary actions to map the incoming request to its service order standards and USOCs. The RBOCs each deployed systems to handle the necessary translations. For example, one system that was deployed and used by many RBOCs at the time was EXACT®.

FIG. 2 illustrates how the addition of access orders and merging of LECs into RBOCs dramatically increased the complexity of service management systems. Separate SOPs 12a through 12d for each local exchange company communicate with respective billing systems 13a through 13d. Manual entry of order information 11 by RBOC personnel is communicated to individual SOPs 12a through 12d, as needed. The new access tariffs are implemented with access order entry system 17. Access order entry system 17 can be accessed both manually 11, as well through an electronic gateway 18.

Many of the newly formed RBOCs wanted to consolidate functionality that resided in each of the LECs. Telecommunications had reached the point where many of the administrative functions no longer needed to be location dependent. By combining these workgroups with common functions, economies of scale would produce large expense and capital savings. Many workgroups did become consolidated; however, those involved directly with service order processing needed to wait. Applications were needed to reduce the complexity caused by individual LEC service order variations and consolidate ordering codes.

From the mid-to-late 90s, many RBOCs attempted to create these new applications or merge existing ones, but most efforts stalled or were abandoned. In some cases partial roll-out occurred, adding another variant to the mix. The results have been less then optimal. For example, FIG. 2 illustrates how order manager systems in a 4-LEC organization was consolidated into two regional inventory systems 14a and 14c. Similarly, the inventory systems of the 4-LECs were consolidated into two systems 15a and 15c.

In 1996, in an attempt to generate competition in the local exchange, Congress passed a bill that required the RBOCs to "unbundle" their local network and support systems if they were to enter the long distance markets. The RBOCs responded by setting up gateways to access their SOP process and billing systems for customer service record retrieval. The gateways that were created fell into two categories—Web GUI access or direct interconnect to the service order applications. By directly accessing the SOPs, the Competitive Local Exchange Carriers (CLEC) inherited the same issues that plagued the RBOCs. This has been a major factor in order fulfillment delays and the challenge for effective competition. CLECs, operating on a much smaller scale and margin, have insufficient resources (personnel, training and skill set) to cope with the variations in ordering they encounter as they move between ILEC regulatory boundaries.

RBOCs responded to the problem by creating gateways with a single set of business rules and format. Although that did not affect the different use of USOCs, there was an improvement. However, RBOCs started to merge and acquire each other as well as acquiring or being acquired by other telecommunications providers. Those phenomena only exacerbated and prolonged the issue—instead of a half a dozen variations within each RBOC, there are dozens.

FIG. 3 illustrates the nature of this increasing complexity. As more LECs are consolidated, increasing number of SOPs 12a-12g; billing systems 13a-13g; order manager systems 14a, 14c, 14e, 14g; and inventory systems 15a, 15c, 15e, 15g must be cross-communicated. Often multiple support systems for access orders 17a, 17d are also involved. Finally, mandated gateways sometimes provide overlapping functions that evolved from business partner relationships. For example, FIG. 3 illustrates connectivity issues for dual Access Service Request (ASR) gateways 18a, 18b; dual Web wholesale gateways 18c, 18d; and dual Local Service Request (LSR) gateways 18e, 18f.

Order management and service provisioning of FIG. 1 varied by local Bell Operating Companies (BOC). Typically the Service Order Processor (SOP) had users input information required to start the order fulfillment process and the system would generate a paper copy of the order for distribution to work groups. This distribution was done via internal courier service commonly referred to as company mail.

The steps for filling a received service order are illustrated in FIG. 4. Beginning with the receipt of an order the work orders and information transfer from Net 1 Pass through Net 4 Pass.

Net 1 Pass—The order was sent to the assignment bureau for switch port and loop assignment. The inventory records of the assignment bureau were kept in handwritten books. The employee would search for a spare port and/or cable pair, (one that did not contain a circuit entry) and, when found, would enter the order and telephone numbers and mark it "pending" to indicate a pending assignment for a service. They would then enter the port and pair designation and distribute the order to the central office and installation center (Net 2 Pass).

Net 2 Pass—In the central office, a technician would connect the switch port to the cable pair and notify the installation center that the work was completed. The installation center would then dispatch a technician to the customer's premise to install the Black telephone set and wire the cable pair into the house. Upon verifying dial tone on the line, the technician would call the dispatch desk to close the job and complete the order. The dispatch desk would note the order complete and distribute it to the assignment bureau (Net 3 Pass).

Net 3 Pass—Upon receiving the order, the assignment bureau personnel would take the inventory books, erase the pending notation and pencil in "working" to indicate the specific inventory item was now a working assignment for the identified service. The assignment bureau employee noted the order as complete and distributed it to the billing office (Net 4 Pass).

Net 4 Pass—In the billing office, the CSR was accessed and updated with the new circuit information. By doing this, the billing system would capture and bill the new service in the next billing cycle, completing the order fulfillment process. This simple process supported 99 percent of all BOC orders. After all, the service we are talking about is Plain Old Telephone Service (POTS) that consisted of a switch port for dial-tone, a copper pair from the switch port to the customer site and a plain black telephone.

For the 1 percent of special or "non-conforming" services, an order was simply handed off to an engineer at the assignment bureau (Net 1 Sp Pass). The engineers had at their disposal (or control) another set of inventory books that contained "specialized" equipment and facilities. The engineer would design the solution and in so doing, determine the special equipment and/or facility required. From that point on, the process was similar to the one for POTS, only it used the special inventory books, hence the name "special services." (Net 1 Sp Pass through Net 3 Sp Pass).

Although the process was a simple one, it had some inherent problems. The most basic was ensuring the order was not lost as paper orders were moved from point to point and person-to-person. In response, a simple system was created know as critical date tracking. As discussed earlier, an order was issued when a customer applied for service. Then it was assigned, wired and installed, and finally completed. This comprised four critical dates: Application date, Assignment date, Installation date and Due date.

While different naming conventions have been used in different localities, these represent the basic milestones of the order fulfillment process. If the order requested a special service, a design date and office wire date was simply added on. This represented a basic project plan and was applied to every order. A standard interval time for each service was then established to ensure timely job completion, which allowed the sales team to project when service could be delivered to a customer at the time of application. But there was still a concern about how to alert the downstream work groups of orders coming in for planning purposes and how to alert them of emerging problems.

Again, individual BOC initiatives were put to work. In some cases, every pass was sent to all the work groups, which involved a lot of paper moving, filing and re-filing. Another method involved recording information from the order into a system that generated nightly reports for a Control Center responsible for the overall order. Clerks would initially enter the order number, circuit ID, customer name and critical dates into the system. A report was generated nightly indicating what was due the following day or two. These were distributed to the workgroups, where they recorded the work they completed or problems encountered. These reports were then returned to the control center, where clerks accessed the order record and input status on the critical dates. That night, along with the reports indicating the next day's work, reports for management would be generated indicating missed dates, completed dates, and in some cases productivity indexes.

By the end of the 1960s, billing, order entry, and order management (control) were all mechanized, albeit through input/output applications with little or no processing. An early solution developed by AT&T was a solution for the local assignment process and the outcome was Central Office Switch Management Operation System (COSMOS®)) application. Although COSMOS® did not contain the local cable pair inventory, it did have all the switch ports. Further, it maintained the assignment record (both port and cable pair) for the orders and circuits. With remote access costs dropping, assignment bureaus, central offices and installation centers were tied into a common application. The system would track the work being done from the various sites and allow field force to clear the clashes. COSMOS® was received well by the BOCs and its deployment was underway by the mid-1970s with millions of inventory items being recorded into its database.

However, during the 1970s, orders for special services began to dramatically increase. This led to development of TIRKS®, an acronym for Trunk Integrated Record Keeping System. Between 1984 and 1987, all BOCs with the exception of Pacific Bell were being supported in TIRKS®. When the BOCs became the Regional Bell Operating Companies in 1984, all former members shared TIRKS® source code. That year, work began on other systems that would directly interface and work in conjunction with TIRKS®. The first of these to come on line was the EXACT® system, used to place access tariff orders. These orders conform to the ASOG standards generated by ATTIS. With its direct interface, using the TIRKS® Communications Manager (TCM®), it allowed the processing of orders directly to TIRKS® and the return of status and circuit design layout information to the originator.

Other systems being developed during this period included WFA-C® (formerly CIMAP-SSC®), WFA-DI® (formerly CIMAP-CC®), WFA-DO® (formerly GDS®), TEMS® (formerly OPS-INE®), NMA®, FACS® Product Line, SOAC® Order Controller, LFACS® Inventory for local loop, SWITCH® Inventory for switch ports (replacement for COSMOS). All of these systems where deployed between 1985 and 1989 in the majority of the RBOCs. These systems are commonly referred to as The Network Legacy Systems (Legacy Systems). Although all these systems have undergone many enhancements over the last 20+ years, they are still supported on the same technology and middleware available at their inception.

One problem facing the Legacy Systems was how to keep all the data records correct across multiple modules. A tool was required that allowed users to identify data discrepancies and assist in the repair. The tool developed was TIRKS® Data Integrity System (TDIS®), which allowed the users' system administrator to run compares between records and indexes to isolate data errors and take appropriate action to repair.

Unfortunately, many companies stopped running the majority of these tests in the late '80s, due to misidentified errors in the runs themselves and lack of computer availability. The TDIS® ran in offline batch mode that interfered with service needs for a 24 hour a day, 7 days a week coverage for operations.

Recently technological changes in telecommunication equipment, personal computers and Internet availability have created a new set of problems in administering communication offerings. In the era of 99% POTS, a structured approach was acceptable. This is less true today.

Consider a DS1 connection: it's made up of 24 timeslots, each one representing a 64 kb clear channel connection. Circuits are assigned to the timeslots just as they would to a cable pair in the local loop. This is exactly the way digital loop carrier is inventoried in the LFACS application. From the application's perspective, it is nothing more than a cable $pair_s$ that gets assigned on a one-to-one basis with a circuit. As a business rule it would read, "You can not have more circuits than there are units available." This represents the inventory books originally used simply mechanized. If you want to add additional circuits, simply increase the amount of units available. If one increases the pipe to a DS3, you can create 28—1.544 mb timeslots or 672—64 kb timeslots. Vary the bandwidth size of the timeslot (increase/decrease) and the total units available for assignment on the pipe will respond accordingly. But what happens when we move beyond these boundaries into a strictly logical structure?

In this scenario, the entry and exit points of the service are defined, but its route and existence depend on the conditions encountered at any particular moment. The reality of data technologies such as Internet Protocol (IP), frame relay and asynchronous transfer mode (ATM), which emerged in the late '80s and early '90s, is that two or more circuits share the infrastructure unit. The legacy systems come up short in their support of this and companies that want to supply these services are required to add point solutions. Recently, the development and growth of optical fiber networks is further stressing the Legacy Systems.

Optical fiber networks generally conform to the synchronous optical network standards know as SONET/SDH. Pushing this technology is the ever increasing available bandwidth over SONET networks. Intelligent optical mesh architectures incorporating intelligent optical switches are being deployed in ever increasing numbers. The benefits of this new technology include automated service activation and inventory management, rapid service provisioning, tiered network restoration, competitive service differentiation and infinite scalability.

To support intelligent optical mesh network service offerings, service providers must rethink their network models and business models. In a mesh architecture, every element in the network is connected to every other element through an intelligent software-based network operating system (NOS). This means that communication between nodes can occur via many diverse routes. This ability allows the provider to create a wide range of service delivery and application possibilities. Adding this level of intelligence to the network enables rapid provisioning, rerouting and restoration of light paths automatically, without requiring the conversion of optics to electrical and back again or the need to reserve additional capacity for protection purposes. The result is increased capacity efficiencies and reduced complexities during service provisioning.

Traditional "Legacy" networks are essentially point-to-point collections of "nailed-up" paths that provide a working route and a protection route. Services must be provisioned on an A-to-Z basis with the routing between each intermediate node being determined, assigned and configured. The design and activation process may be manual and require operations resources to travel to the location of each network element and physically set up a circuit for service. The interval between application for service and delivery can take as long as 30 to 90 days.

In contrast for an intelligent mesh network, the process for activating service is less complicated and can be completed in minutes. A service request is made to select and establish a service route and a circuit is set up instantly through the intelligent routing and signaling software that exists on every element of the network. This frees bandwidth that would have been set aside for protection in a Legacy environment, thereby increasing the capacity for revenue generation. The flexibility of the mesh architecture, allows the allocation of only as much working and protection bandwidth required by the customer to meet the current demand conditions.

This also allows service resellers to only pay for the service they need when they need it. Meshed networks enable service resellers to take advantage of opportunities as they occur.

With all of these various telecommunication offerings and with the competing technologies part of their inventory (or accessed through trading partnerships), most large telecommunication carriers have resorted to specializing their sales forces, as exemplified in FIG. 5. Separate sales and support staff are utilized to support different segments (e.g. Small Business vs. Large Business vs. Wholesale) with additional specialized staff for digital services (ISDN, xDSL, Data Services). This has led to increased costs and competing order entry of common inventory.

FIG. 6 illustrates how an "intelligent order entry process" simplifies the sales and customer service organization for ILECs, and CLECs. A single, consolidated sales force enters all service requests into an intelligent service management system. The intelligent service management system prompts the sales force for required information and then generates all required sub-orders for needed services. Service sub-orders for intelligent optical mesh networks can also be included to address special requirements of these new telecommunication offerings.

New management systems such as intelligent service management system are required to attain the efficiencies of an intelligent switched mesh network and provide the foundation for new high-speed services. Using the industry's optical networking software, intelligent optical switching products are permitting carriers to build an all-switched meshed network. A switched meshed network creates a dynamic foundation for next generation high-speed services. Simplifying and streamlining the network infrastructure from the core, the switched meshed network enables real-time provisioning, automatic routing of traffic, and simplified network management. The meshed network provides greater restoration path alternatives, leading to higher availability of the network. This is extremely important in the event of multiple failures. Meshed Networks provide the same levels of service as the tried and true SONET/SDH network, while permitting providers to differentiate their new service offerings and tiered restoration schemes. Switched meshed networks allow providers to roll out new services in days instead of months. Bandwidth is provided on a "just-in-time" delivery and can be dynamically reassigned on the fly.

What is needed then is an Intelligent Service Management System that can streamline sales and support staff, reduce manual entries, interface between carriers and trading partners, and allow for bandwidth-on-demand provisioning of intelligent mesh networks.

BRIEF SUMMARY OF THE INVENTION

It is therefore an objective of the present invention to provide automated support to order entry and management for telecommunication services.

It is a further objective of the present invention to support ordering of telecommunication services regardless of the service type, service location, service provider or network topology.

It is still another objective of the present invention to simply telecommunication ordering process from a variety of suppliers of telecommunications services.

It is a further objective of the present invention to allow maximum use of legacy systems for ordering telecommunication services.

It is still another objective of the present invention to provide "smart" ordering services to a user by presenting the user with templates illustrating the services that are available to the user based on the user's location.

It is a further objective of the present invention retrieve and store business rules associated with the services that are provided by different telecommunication service providers.

It is still another objective of the present invention to provide knowledge based service templates for dynamic system process and routing of telecommunication services.

The present invention comprises a system and method for telecommunication system order entry, processing and billing. A telecommunication user entity enters and orders via a web based template. The template is generated based upon location information of the user entity. In order to eliminate errors, the systems of the present invention operates in a knowledge-based fashion storing information on various telecommunication providers, together with the business rules associated with ordering services from those providers. Further the system of the present invention first determines the location of the user entity and, based on that location provides a template to the user entity with those telecommunication services that are available in the locale of the user entity. Services that are not available are not shown to the user entity on the ordering template.

Once the user entity completes the order for telecommunication services, the system of the present invention automatically creates orders for sub-components and submits sub-orders to the various telecommunication service providers thereby allowing the user to receive the services desired without the user having to know the intricacies of the business rules of multiple telecommunication service providers.

The system of the present invention further facilitates billing for services since it interfaces with the various disparate billing systems of the telecommunication service providers. This in turn allows invoicing to the user entity in a consolidated fashion.

Using the present invention not only are user entities better able to more simply order telecommunication services, the provisioning of those services occurs in a more error free and rapid manner. Additionally, the telecommunication service providers can offer more services according to their own business rules without regard to being compatible with the business rules and billing practices of other telecommunication service providers.

BRIEF DESCRIPTION OF THE DRAWINGS

FIG. 1 illustrates a pre-1984 LEC Service Management System;

FIG. 2 illustrates a 1984-1996 era LEC Service Management System;

FIG. 3 illustrates a post-1996 LEC Service Management System;

FIG. 4 illustrates a pre-1984 Service Order Fulfillment Process;

FIG. 5 illustrates a present day Order Entry Process;

FIG. 6 illustrates an Intelligent Order Entry Process;

FIG. 7 illustrates one embodiment of an Intelligent Service Management System;

FIG. 8 illustrates an overview of one embodiment of an Intelligent Service Management System;

FIG. 9 illustrates an overview of an embodiment of an Intelligent Service Management System further comprising a Direct Bus Connection and Workflow Engine;

FIG. 10 illustrates an overview of one embodiment of an Intelligent Service Management System further comprising a workflow suitable for support of a Wholesale Carrier; and FIG. 11 illustrates an Intelligent Service Management System according to a generalized embodiment of the present invention.

DETAILED DESCRIPTION OF THE INVENTION

The present invention is directed toward an Intelligent Service Management System for use in telecommunications provisioning and managing. FIG. 7, FIG. 8, FIG. 9, FIG. 10, and FIG. 11 illustrate various embodiments of the present invention and will be further described below. FIG. 7, FIG. 8, FIG. 9, FIG. 10, and FIG. 11 are examples of the present invention but should not be held to be limiting. Certain embodiments of the present invention may omit or combine enumerated functions as well as adding specialized options. For example, optimum cost provisioning process 51 may be omitted while options such as intelligent mesh network templates may be separated from non-mesh network elements.

The present invention comprises a system useful to integrated communications providers (ICPs) and resellers of ICP services for providing sales proposals based upon customer service records. As used in this description, the following definitions apply:

ANSI—American National Standards Institute—United States-based organization that develops standards and defines interfaces for telecommunications.

ASR—Access Service Request—A request for service covered under the FCC's access tariffs, as described by Order and Billing Forum.

ATM—Asynchronous Transfer Mode—An international ISDN high-speed, high-volume, packet switching transmission protocol standard. ATM uses short, uniform, 53-byte cells to divide data into efficient, manageable packets for ultra-fast switching through a high-performance communications network.

B2B Gateway—Example of Internet based electronic commerce. Other examples include XML EDI.

CLEC—Competitive Local Exchange Carrier

CORBA—Common Object Request Broker Architecture—an architecture neutral, object oriented client-server solution. With CORBA you can abstract an object by its services and publish these using the IDL (Interface Definition Language). A client can then connect to and use these services.

CMIS/CMIP—Common Management Information Services and Protocol—international standard for network management protocol.

CRIS—Billing system

CSR—Customer service record

DD—Due Date—The date in which a communication service request is scheduled to be completed.

DLR—Digital Line Request—Request for digital communication services.

DSL—Digital subscriber line—allows broadband communication services over copper telephone lines EDI—Electronic data interchange—An industry standard (ANSI X12, X.400) for direct computer-to-computer information exchange and a collection of standard message formats and element dictionary in a simple way for businesses to exchange data via any electronic messaging service.

FEPS—Front End Processors

FID—Field Identifier—Used on service orders that indicates more data will follow. Also used as a label on a service order that prefaces service order information. FIDs are alpha or alphanumeric codes that identify retained information on an account, indicate physical or record activity, generate or negate non-recurring charges, specify recurring charges, document work done by various departments and identify facilities used to provide service.

FOC—Failure of Confirmation—A form of error message created when a request for communication services is either not received by or accepted by the services provider.

Frame Relay—Industry-standard, switched data link layer protocol that handles multiple virtual circuits using HDLC encapsulation between connected devices.

ICP—Integrated communications provider

ILEC—Incumbent local exchange carrier

ISDN—Integrated Services Digital Network. Communication protocol, offered by telephone companies, that permits telephone networks to carry data, voice, and other source traffic.

ISP—Internet Service Provider—a company that provides individuals and other companies access to the Internet and other related services.

IXC—Inter-exchange Carrier—A carrier authorized by the Federal Communications Commission (FCC) to provide interLATA, interstate and/or international long distance communications services; a carrier authorized by a state Public Utility Commission (PUC) to provide long distance communications service but not local exchange service within state boundaries. Also referred to as "IC", "IEC", or "IXC".

LATA—Local Access and Transport Area.

LCC—Line Class Code—Identifies to the switch a particular class of service. It can be identified by a USOC, FID, or some combination of the two. The FID would modify the USOC by qualifying the class of service with specific attributes such as 700/900 blocking.

LEC—Local exchange carrier

LSR—Local Service Request—A request for service covered under the Local utility commission's tariffs, as described by Order and Billing Forum.

LST—Line and Station Transfer—Rearrangement of outside network facilities to support service activation.

NAAR—Network Address Assignment Request—Request for a network address assignment such as phone number or Internet protocol addresses (IP address).

NCON—Network Configuration Software System supported by Telecordia Technologies

NMA—Network Monitoring and Analysis Software System supported by Telecordia Technologies NMS—Number Management System NSDB—Network Services Database supported by Telecordia Technologies OBF—Order and Billing Forum PICS—Primary Inter-Exchange Carriers—the long distance company to which traffic is automatically routed when an end user dials 1+ in equal access areas.

POTS—Plain Old Telephone Service—Basic telephone service for the transmission of human speech.

RBOC—Regional Bell Operating Companies

SOAC—Service Order Analysis and Control System—System that controls the flow of orders through the provisioning process SONET—Synchronous Optical Network—1984 ANSI standard for optical fiber transmission on the public network. 52 Mbps to 13.22 Gbps standard for communications over a fiber optic network.

TEMS—Telecommunication Equipment Manufacturers

TIRKS—Trunk Integrated Record Keeping System

TMN—Telecommunications Management Network. Based on ITU-T Recommendation M.3010, a TMN divides a telecommunications management scheme into functional architecture, physical architecture, information architecture and logical layer architecture.

TN—Telephone Number—A ten digit number comprised of an area code (NPA), an exchange (NXX), and an extension.

USOC—Universal Service Order Code—An alphanumeric coding scheme that identifies products and services that have been ordered by a customer.

VOD—Video On Demand.

VoDSL—Voice over DSL. The ability to carry normal telephone-style voice over a digital subscriber line (DSL) with POTS-like functionality, reliability, and voice quality.

VoIP—Voice over IP. The ability to carry normal telephone-style voice over an IP-based Internet with POTS-like functionality, reliability, and voice quality.

VPN—Virtual Private Network—Switched network with special services like abbreviated dialing. A customer can call between offices in different area codes without having to dial all eleven digits.

WFA—Workforce Administration System supported by Telecordia Technologies XML-Extensible Markup Language. Subset of Standard Generalized Markup Language (SGML) defined in ISO specification 8879:1985. XML omits some SGML optional features and provides a file format for representing data, a schema for describing data structure, and a mechanism for extending and annotating HTML with semantic information. XML specification is maintained by the World Wide Web Consortium. XML documents can incorporate document type declaration (DTD) into the document or use a separately stored DTD.

XML/EDI—Extensible Markup Language integrated into Electronic Data Interchange. XML/EDI provides a standard framework to exchange different types of data—for example, an invoice, healthcare claim, project status—so that the information be it in a transaction, exchanged via an Application Program Interface (API), web automation, database portal, catalog, a workflow document or message can be searched, decoded, manipulated, and displayed consistently and correctly by first implementing EDI dictionaries and extending our vocabulary via on-line repositories to include our business language, rules and objects. Guidelines for XML/EDI are available from the XML/EDI Group.

In general the present invention is an Intelligent Service Management System providing smart ordering of telecommunication services and management of telecommunication assets. The system utilizes an Enterprise Bus/Request Broker interface to communicate with telecommunication carrier proprietary support systems. In addition to Enterprise Bus communication the Intelligent Service Management System (ISMS) provides functionality for pre-order and order decomposition.

FIG. 7 illustrates one embodiment of the invention comprising numerous components that are integrated into a single ISMS 700. FIG. 7 can be understood by following the flow of a typical telecommunications request from pre-order to fully provisioned service. In this embodiment of ISMS 700, the Enterprise Bus/Request Broker 750 is integrated into ISMS 700 and provides the translation and network connection to external systems such as inventory 761, billing 762, SOPs 764, specialized network management 763 and other information systems 765. An example of specialized network management 763 is real-time bandwidth provisioning of mesh network elements.

A request for telecommunications proposal or service is first entered 701 as pre-order request 702. The pre-order entry initiates an automatic process that results in proposal generation 704.

During proposal generation 704 the customer service record (CSR) is first retrieved from the current telecommunications provider and summarized 703. This is an automatic step and ensures that none of the existing services are omitted or "fall through the cracks." Proposal generation module 704 makes calls, as needed, to validate that the number of requested telephone numbers (address) are available 705 and validate that network (e.g. Internet) addresses are available 707. Address validation 705 accesses the address database 706 while network address administration accesses database 708.

During proposal generation 704, one of more of Business Knowledge Templates 711 may be accessed. These templates provide models for every type of telecommunication service available. Service template 712 defines service features and parameters as well as identifying data needed to be collected for ordering a particular service. For example, data to be collected may include directory listings, network addresses, PIC requirements, pricing or other data. By using service template 712, the data entry process is reduced to only data needed for the requested services.

Design template 713 defines how a telecommunications service product is to be provided within a Domain. Domains are defined by the user of the ISMS to correspond to convenient demarcation points. For example, Domains may distinguish between LECs, geographic areas, or customer groupings. Within the design template are the network models used to "build" a telecommunications service product. They further identify sub-components required for a given service. Sub-components are indexed to component provider (e.g. trading partner, company or system), order type required and dependencies between components.

Component task template 714 identifies tasks required to add or remove a component defined in the related Design Template 713. Examples of data provided by Component task template 714 include: identification of the tasks associated with a specific activity, duration between tasks, critical tasks, exception routing. In effect, Component task template 714 associates specific activities to component requests.

Trading partner catalog 715 identifies trading partner rules and codes for ordering various components and services. Trading partner catalog 715 may also index trading partner codes to telecommunication service products and features. Examples of the types of trading partner codes typically supported include USOC, FIDS, ISOC, and Hardware identification codes.

Although the invention has been expressed in terms of these four templates, this is in no way limiting to the invention. Business knowledge templates 711 provide a common repository for interrelationships, components, provisioning tasks and availability for all telecommunication services being supported by the ISMS. The advantage of a repository function is to allow external functions of the ISMS to act in consistent fashion. The variability specifics of a telecommunication service are required to be identified only within the templates.

Template information can be reorganized within the described templates or other templates and still be within the scope and meaning of the present invention. For example, Design Template 713 and Component Template 714 could be combined into a single template. Such a change would likely cause higher computer operating overhead but the functioning of the ISMS would remain intact.

Once a proposal is generated, it is transmitted or otherwise communicated to the requesting customer or enterprise. It is stored in the proposal generation system until such time as approval from the requesting customer or enterprise is received. Once a proposal is approved, the proposal is released to become an order in order entry module 721.

Order entry 721 begins with the receipt of an approved order. Orders are stored in order database 722. The order is then transferred to work scheduler 723. The final result of the work scheduler 723 is to produce a service task list 726 that is transmitted to the provisioning management process 733. Preferably the ISMS incorporates an optimum cost provisioning process 724 that selects available circuits and network elements from the circuit state database 725 to find the least cost solution for the requested services, taking into account component design and provisioning parameters from business knowledge templates 711. An alternate strategy is to use the optimum cost provisioning process to preferentially select on-net network assets by assigning "discounted" pricing levels for on-net assets. This strategy realizes higher utilization levels of a carriers assets and lower dependencies on external partners.

Provisioning management process 733 receives service tasks lists from work scheduler 723 or from operations 732 inputting requests 731. For example, customer support personnel or field personnel can use terminals 731 in response to service failures or to initiate diagnostic requests.

Provisioning management process 733 generates a work group activities list 734 as well as internal and external purchase orders 735. Purchase orders are scheduled for release by provisioning management process 733. Requests are issued using interconnection rules 736, including trading partner interconnection business rules in database 737. Work group activities in work group activities list 734 are typically for in-house service groups while interconnection requests are typically issued to trading partners (transmitted via enterprise bus/request broker 750).

Enterprise bus/request broker 750 is preferably an OBF and EDI standards compliant interconnection gateway providing automated electronic access to ILEC and ICP trading partner order systems. User-definable configuration files are used to compensate for individual ILEC or trading partner variations to these standards. The gateway allows an ICPs internal order management system to transfer and share relevant information including customer service record (CSR) retrieval, order fulfillment requests, and order status updates with ILEC or ICP trading partner systems. In addition, the gateway preferably handles data translations for EDI, CORBA, CMIP/CMIS, as well as translating coded information from foreign systems (including proprietary protocols).

More preferably Enterprise bus/request broker 750 utilizes an XML or XML/EDI gateway (see definitions above). For the embodiment of the invention illustrated in FIG. 7, useful XML application program interfaces (API)s include: service order entry inbound, service order status outbound, service request outbound, service request inbound, service request status outbound and service request status inbound.

FIG. 7 illustrates optimum cost provisioning process 724 interrelated to work scheduler 723. When cost optimization is not needed, this module can be omitted from the ISMS. Alternately, optimum cost provisioning process 724 may be also interrelated to proposal generation 704. By combining optimum cost provisioning process 724 with proposal generation 704, a communications carrier can determine if higher customer discounts could be offered or if other service topologies should be quoted to the customer.

FIG. 8 illustrates an overview of an intelligent service management system (ISMS) 800 wherein ISMS 800 interfaces to an external enterprise bus/request broker 850. ISMS 800 provides similar functions of the ISMS of FIG. 7, including pre-order entry and validation, proposal generation, order management, order decomposition, service request and purchase order generation, service status tracking along with communication to external billing 861, inventory 863 and SOP systems 864. The external systems 861, 863 and 864 are, in general, associated with trading partners. For this reason, FIG. 8 highlights how a trading partner may have a separate order manager 862 that interfaces between the ISMS and the trading partner's inventory system.

FIG. 8 is a convenient embodiment of the present invention for one RBOC to consolidate its telecommunication service offerings from its subsidiary local exchange carriers (LEC). Hence this embodiment removes one of the large impediments to successful LEC mergers. It also provides for wholesale service trading partners 811, for example CLECs, to place their wholesale orders through wholesale service request gateway 812. Other service requests, originating within the LEC (or LEC merged with the carrier) may use Internet service request gateway 823. This allows order requests to originate at virtually any terminal 821 connected to Internet 822. In certain preferred embodiments of FIG. 8, wholesale service request gateway 812 uses extensible markup language for electronic data interchange (XML/EDI). XML/EDI provides electronic commerce between trading partners.

When used at the RBOC level, ISMS 800 allows RBOC customers to order and receive telecommunication services, purchasing and invoicing at the RBOC level. This allows an RBOC to support a large enterprise customer with single source contact, provisioning and invoicing. Enterprise customer may use Internet service request gateway 823 to request RBOC level customer service record, orders and status. ISMS 800 retrieves LEC level customer service records 801, issues LEC specific orders 802. The translations between LEC specific service offerings and RBOC level services are performed automatically by ISMS 800. Similarly, RBOC provisioning orders 803 are translated, transmitted and their status tracked between ISMS 800 and the LECs using enterprise bus/request broker 850.

The embodiment of the present invention illustrated in FIG. 9 is similar to the embodiments of FIG. 7 and FIG. 8 and similar functionality is provided. Operator interface with ISMS 900 may originate with a terminal 901 attached to enterprise bus/request broker 950 or using a terminal 911 connected via Internet 912. For consistency, certain preferred embodiments display all data in an Internet browser format. This may be done to minimize personnel training and give a consistent and integrated "touch and feel" for users of ISMS 900.

As telecommunication service orders proceed through the stages of pre-order (proposal) through design and provisioning a workflow engine 920 provides an efficient tracking and forwarding mechanism with little software development overhead. Workflow engine 920 tracks completions of tasks and automatically forwards and notifies systems or personnel of pending tasks. Workflow engines are available from a number of software vendors, for example SAIC, and are selected based upon the supporting computer operating system. SAIC workflow engines are particularly preferred for web portal style applications.

ISMS 900 supports connectivity to billing systems including CRIS billing system 910. Similarly ISMS 900 provides interfaces as well as support for external systems 961 though 975. Acronyms for these systems can be found above in the definitions.

FIG. 10 illustrates an embodiment of the present invention geared toward support of wholesale carriers, for example CLECs. In the case, ISMS 1000 allows a RBOC to present to the outside world a single image of telecommunication service offerings, regardless of the details at the subsidiary LEC level. ISMS 1000 functions are similar to those provided in other embodiments of the invention (e.g. pre-order entry and validation, proposal generation, order management, order decomposition, service request and purchase order generation, service status tracking along with communication via enterprise bus/request broker 1050 to external Legacy applications 1060, next generation applications 1065, assurance systems 1070, vendor network management systems 1075 and B2B Gateways 1080. Workflow engine 1020 tracks and controls a service order through the various stages from pre-order through provisioning. Wholesale customers can either enter their service and CSR requests at a terminal or system 1031 communicating over Internet 1032 through Internet smart order entry gateway 1030. As an alternate, wholesale customers may be allowed to enter their service and CSR requests 1001 using other connected system.

FIG. 11 illustrates a more generalized form of an Intelligent Service Management System (ISMS) 1100 according to the present invention and comprises business knowledge templates 1110, order entry functions 1120, order management functions 1130, telecommunication provisioning and tracking functions 1140 and interconnection 1150 to external systems. Examples of outside systems include inventory systems 1161, billing systems 1162, specialized network management systems 1163, SOPs systems 1164 and other IS systems 1165. Connectivity is provided using an enterprise bus/request broker 1160 and optionally over the Internet 1170. Preferably 1110 presents a "web portal" look and feel to users. ISMS 1100 provides a scalable and modular architecture, able to meet current and emerging needs of the telecommunication services industry. ISMS 1100 is preferably configured to support order components for major data protocols and technologies including ATM, SONET, xDSL, TCP/IP, VoIP and frame relay. Optionally, ISMS 1100 provides support for intelligent mesh network through appropriate templates.

While the present invention has been described in the context of preferred embodiments, it will be readily apparent to those skilled in the art that other modifications and variations can be made without departing from the spirit or scope of the present invention. For example, business knowledge templates may be reorganized as to which functions reside in which template. Further, templates may be specialized to support emerging technologies such as intelligent mesh networks with online bandwidth provisioning. Accordingly, it is not intended that the present invention be limited to the specifics of the foregoing description of preferred embodiments, but rather as being limited only by the scope of the invention as defined in the claims appended hereto In an embodiment, a system for supporting the management of telecommunication services for either an enterprise or telecommunications carrier comprises a computer processor, an order entry component, an interconnection component, a provisioning management component, an order management component (also referred to as a circuit management component), and a design management component. Optionally, the system may further comprise an enterprise bus request broker.

In this embodiment, the computer processor comprises a graphical user interface for displaying information or data entry prompting requests to a human operator and means for inputting and processing information necessary to the management of telecommunication services.

The order entry component comprises instructions for retrieving customer service records from telecommunication service providers and translating the customer service records into equivalent telecommunication services. In an embodiment, the customer service records are retrieved using electronic data exchange with the telecommunication service providers The interconnection component comprises instructions for transferring information to and receiving information from telecommunication service providers. In an embodiment, the interconnection component utilizes extendible markup language for intercommunications with one or more telecommunication service providers The provisioning management component comprises instructions for creating and tracking work plans. By way of illustration and not as a limitation, a work plan may comprise a work activity event for performing installation or troubleshooting of each sub-model component of a telecommunications service.

The order (or circuit) management component comprises instructions for creating a hierarchal list comprising on-net telecommunication service assignments and off-net telecommunication service assignments, creating a cutover work plan, and an automatic means of receiving requests from trading partners of an integrated communications provider (ICP). The requests from trading partners are either rejected or inserted into the hierarchal list.

The design management component comprises instructions for automatically selecting a communications service model, decomposing said service model into sub-model components and creating a communications design therefrom, and automatically issuing service requests to ICP trading partners.

In another embodiment, the system for supporting the management of telecommunication services of claim 1, further comprising a workflow engine. The workflow engine decomposes the service model into sub-model components based upon whether crossing of plural networks is appropriate to provide requested telecommunication services and on the service providers that are available to provide service consistent with the location of the customer. The workflow engine creates a telecommunications design from the sub-model components based on order rules of the service providers.

In an embodiment, the system for supporting the management of telecommunication, further comprising a optimum cost provisioning process. In an embodiment, the optimum cost provisioning process is accessible by the order entry component and the order management component.

In another embodiment provides a method of supporting the management of telecommunication services for a service using entity, telecommunication service records of the service using entity being translated into equivalent telecommunication services. An order for specified telecommunication services from the service using entity is accepted. A telecommunications service model is selected to provide the specified telecommunication services ordered based upon the equivalent telecommunication services. The telecommunications service model is decomposed into sub-model components based upon whether crossing of plural networks is appropriate to the specified telecommunication services ordered and which service providers are available to provide service consistent with location of the service using entity.

A telecommunications design is created from the sub-model components based on order rules of the service providers. In an embodiment, a service provider is a trading partner of an Integrated Communications Provider (ICP).

Work plans, which correspond to the telecommunications design, are transmitted to the service providers via a network. By way of illustration and not as a limitation, the network may be an electronic data interchange (EDI) communications network. The work plans are tracked based on information received from the one or more service providers via the network. In an embodiment, the work plans are transmitted using extensible markup language (XML). In another embodiment, the information received from the one or more service providers uses extensible markup language (XML).

In an embodiment, service parameter specifications are elicited adaptively based on the type of service being specified.

In another embodiment, a hierarchal list comprising on-net telecommunication service assignments and off-net telecommunication service assignments is created. Re requests are received from trading partners of an Integrated Communications Provider (ICP) and are either rejected or inserted into said hierarchal list.

In still another embodiment, a server for supporting the management of telecommunication services for a service using entity, telecommunication service records of the service using entity being translated into equivalent telecommunication services, comprises a data processor and a memory comprising software instructions. The memory communicates with the data processor.

The software instructions enable the processor to accept an order for specified telecommunication services from the service using entity, select a telecommunications service model to provide the specified telecommunication services ordered, based upon the equivalent telecommunication services, decompose the telecommunications service model into sub-model components based upon whether crossing of plural networks is appropriate to the specified telecommunication services ordered and which one or more service providers are available to provide service consistent with location of the service using entity, create a telecommunications design from the sub-model components based on order rules of the service providers, transmit one or more work plans, which correspond to the telecommunications design, to the service providers via a network, and track the work plans based on information received from the one or more service providers via the network. In an embodiment, the work plans are transmitted using extensible markup language (XML).

In an embodiment, the software instructions further enable the processor to elicit service parameter specifications adaptively, based on the type of service being specified.

In an embodiment, the software instructions further enable the processor to create a hierarchal list comprising on-net telecommunication service assignments and off-net telecommunication service assignments and receiving requests from trading partners of an Integrated Communications Provider (ICP). The requests from the trading partners are either rejected or inserted into the hierarchal list.

An embodiment provides a method of supporting the management of telecommunication services for a user. Location information is elicited from the user. The user is provided with service options based on location information provided by the user. An order for specified telecommunication services is accepted from the user. A telecommunications service model is selected to provide the specified telecommunication services ordered. The telecommunications service model is decomposed into sub-model components based upon whether crossing of plural networks is appropriate to the specified telecommunication services ordered and which service providers are available to provide service consistent with the location information provided by the user. A telecommunications design is created from the sub-model components based on order rules of the service providers. In an embodiment, a service provider is a trading partner of an Integrated Communications Provider (ICP).

One or more work plans corresponding to the telecommunications design is transmitted to one or more of the service providers via a network. By way of illustration and not as a limitation, the work plans are transmitted using extensible markup language (XML). The work plans are tracked based on information received from the service providers via the network. By way of illustration and not as a limitation, the network comprises an electronic data interchange (EDI) communications network.

In an embodiment, a server for supporting the management of telecommunication services for a user comprises a data processor and a memory comprising software instructions. The memory communicates with the data processor. The software instructions enable the processor to elicit location information from the user, provide the user with service options based on location information provided by the user, accept an order for specified telecommunication services from the user, select a telecommunications service model to provide the specified telecommunication services ordered, decompose the telecommunications service model into sub-model components, based upon whether crossing of plural networks is appropriate to the specified telecommunication services ordered and which service providers are available to provide service consistent with the location information provided by the user, create a telecommunications design from the sub-model components based on order rules of the service providers, transmit one or more work plans, which correspond to the telecommunications design, to one or more of the service providers via a network; and track the work plans based on information received from the service providers via the network.

What is claimed is:

1. A method of supporting the management of telecommunication services for a service using entity, comprising:
    accepting, by a data processor, an order for specified telecommunication services from the service using entity;
    retrieving, by the data processor, a customer service record (CSR) associated with the service using entity from a current telecommunications service provider;
    determining, by the data processor, existing services of the user from the CSR;
    selecting, by the data processor, a telecommunications service model from a template repository to provide the specified telecommunication services ordered, inclusive of telecommunication services that are equivalent to the existing services;
    decomposing, by the data processor, the telecommunications service model into sub-model components using the template repository based upon which one or more service providers are available to provide service consistent with location of the service using entity;
    creating a telecommunications design, by the data processor, from the sub-model components utilizing the template repository based on order rules of the one or more service providers;
    creating, by the data processor, a proposal for approval of the service using entity from the telecommunications design;
    when the proposal is approved by the customer, then creating, by the data processor, an order for the telecommunications services; transmitting a service request to the one or more service providers via a network, wherein the service request comprises an order for at least one of the sub-model components reflected in the telecommunications design; and
    tracking, by the data processor, the service request based on information received from the one or more service providers via the network.

2. The method of supporting the management of telecommunication services as claimed in claim 1, wherein the service request is transmitted using extensible markup language (XML).

3. The method of supporting the management of telecommunication services as claimed in claim 1, wherein the information received from the one or more service providers uses extensible markup language (XML).

4. The method of supporting the management of telecommunication services as claimed in claim 1, wherein the network comprises an electronic data interchange (EDI) communications network.

5. The method of supporting the management of telecommunication services as claimed in claim 1, wherein the one or more service providers are trading partners of an Integrated Communications Provider (ICP).

6. The method of supporting the management of telecommunication services as claimed in claim 1 further comprising:
    eliciting service parameter specifications adaptively, based on the type of service being specified.

7. The method of supporting the management of telecommunication services as claimed in claim 1, further comprising:
    creating a hierarchal list comprising on-net telecommunication service assignments and off-net telecommunication service assignments; and
    receiving requests from trading partners of an Integrated Communications Provider (ICP);
    wherein requests from the trading partners are either rejected or inserted into said hierarchal list.

8. A server for supporting the management of telecommunication services for a service using entity, telecommunication service records of the service using entity being translated into equivalent telecommunication services, the server comprising:
    a data processor;
    a memory in addressable communication with the data processor, the memory comprising software instructions for:
        accepting an order for specified telecommunication services from the service using entity;
        automatically retrieving a customer service record (CSR) associated with the service using entity from a current telecommunications service provider;
        determining existing services of the user from the CSR;
        utilizing a template repository to select a telecommunications service model to provide the specified telecommunication services ordered, inclusive of the telecommunication services that are equivalent to the existing services;
        utilizing the template repository to decompose the telecommunications service model into sub-model components based upon which one or more service providers are available to provide service consistent with location of the service using entity;
        utilizing template repository to create a telecommunications design from the sub-model components based on order rules of the one or more service providers;
        creating a proposal for approval of the service using entity from the telecommunications design;
        when the proposal is approved by the service using entity, then creating an order for the telecommunications services;

transmitting a service request to the one or more service providers via a network, wherein the service request comprises an order for at least one of the sub-model components reflected in the telecommunications design; and tracking the service request based on information received from the one or more service providers via the network.

9. The server for supporting the management of telecommunication services as claimed in claim 8, wherein the service request is transmitted using extensible markup language (XML).

10. The server for supporting the management of telecommunication services as claimed in claim 8, wherein the processor further comprises software instructions for eliciting service parameter specifications adaptively, based on the type of service being specified.

11. The server for supporting the management of telecommunication services as claimed in claim 8, the wherein the processor further comprises software instructions for:

creating a hierarchal list comprising on-net telecommunication service assignments and off-net telecommunication service assignments; and receiving requests from trading partners of an Integrated Communications Provider (ICP);

wherein requests from the trading partners are either rejected or inserted into said hierarchal list.

12. A method of supporting the management of telecommunication services for a user comprising:

eliciting, by a data processor, location information from the user;

providing, by the data processor, the user with service options based on location information provided by the user;

accepting an order, by the data processor, for specified telecommunication services from the user;

retrieving, by the data processor, a customer service record (CSR) associated with the user from a current telecommunications service provider;

determining, by the data processor, existing services of the user from the CSR;

selecting, by the data processor, a telecommunications service model from a template repository to provide the specified telecommunication services ordered;

decomposing, by the data processor, the telecommunications service model into sub-model components utilizing the template repository based upon which one or more service providers are available to provide service consistent with the location information provided by the user;

creating, by the data processor, a telecommunications design from the sub-model components based utilizing the template repository on order rules of the one or more service providers;

creating, by the data processor, a proposal for approval of the user from the telecommunications design;

when the proposal is approved by the user, then creating, by the data processor, an order for the telecommunications services;

transmitting, by the data processor, a service request to the one or more service providers via a network, wherein the service request comprises an order for at least one of the sub-model components reflected in the telecommunications design; and tracking, by the data processor, the service request based on information received from the service providers via the network.

13. The method of supporting the management of telecommunication services as claimed in claim 12, wherein the service request is transmitted using extensible markup language (XML).

14. The method of supporting the management of telecommunication services as claimed in claim 12, wherein the network comprises an electronic data interchange (EDI) communications network.

15. The method of supporting the management of telecommunication services as claimed in claim 12, wherein the one or more service providers are trading partners of an Integrated Communications Provider (ICP).

16. A server for supporting the management of telecommunication services for a user comprising:

a data processor;

a memory in addressable communication with the data processor, the memory comprising software instructions for:

eliciting location information from the user;

providing the user with service options based on location information provided by the user;

accepting an order for specified telecommunication services from the user;

automatically retrieving a customer service record (CSR) associated with the service using entity from a current telecommunications service provider;

determining existing services of the user from the CSR;

utilizing a template repository to select a telecommunications service model to provide the specified telecommunication services ordered;

utilizing the template repository to decompose the telecommunications service model into sub-model components based upon which one or more service providers are available to provide service consistent with the location information provided by the user;

utilizing the template repository to create a telecommunications design from the sub-model components based on order rules of the one or more service providers;

creating a proposal for approval of the user from the telecommunications design;

when the proposal is approved by the user, then creating an order for the telecommunications services;

transmitting a service request to the one or more service providers via a network, wherein the service request comprises an order for at least one of the sub-model components reflected in the telecommunications design; and tracking the service request based on information received from the service providers via the network.

17. The server for supporting the management of telecommunication services for a user as claimed in claim 16, wherein the service request is transmitted using extensible markup language (XML).

18. The method of supporting the management of telecommunication services as claimed in claim 1, wherein creating the service request comprises:

referring the order to a circuit state database comprising available circuits and network elements; and applying an optimum cost provisioning process to the available circuits and network elements from the circuit state database to identify a least cost solution for the sub-model components identified in the telecommunications design.

19. The server for supporting the management of telecommunication services as claimed in claim 8, wherein the software instructions for transmitting the service request comprises instructions for:

referring the order to a circuit state database comprising available circuits and network elements; and applying an optimum cost provisioning process to the available circuits and network elements from the circuit state database to identify a least cost solution for the sub-model components identified in the telecommunications design.

20. The method of supporting the management of telecommunication services as claimed in claim 12, wherein creating service request comprises:

referring the order to a circuit state database comprising available circuits and network elements; and applying an optimum cost provisioning process to the available circuits and network elements from the circuit state database to identify a least cost solution for the sub-model components identified in the telecommunications design.

21. The server for supporting the management of telecommunication services for a user as claimed in claim 16, wherein the software instructions for transmitting the service request comprises instructions for:

referring the order to a circuit state database comprising available circuits and network elements; and applying an optimum cost provisioning process to the available circuits and network elements from the circuit state database to identify a least cost solution for the sub-model components identified in the telecommunications design.

* * * * *